Figure 1:
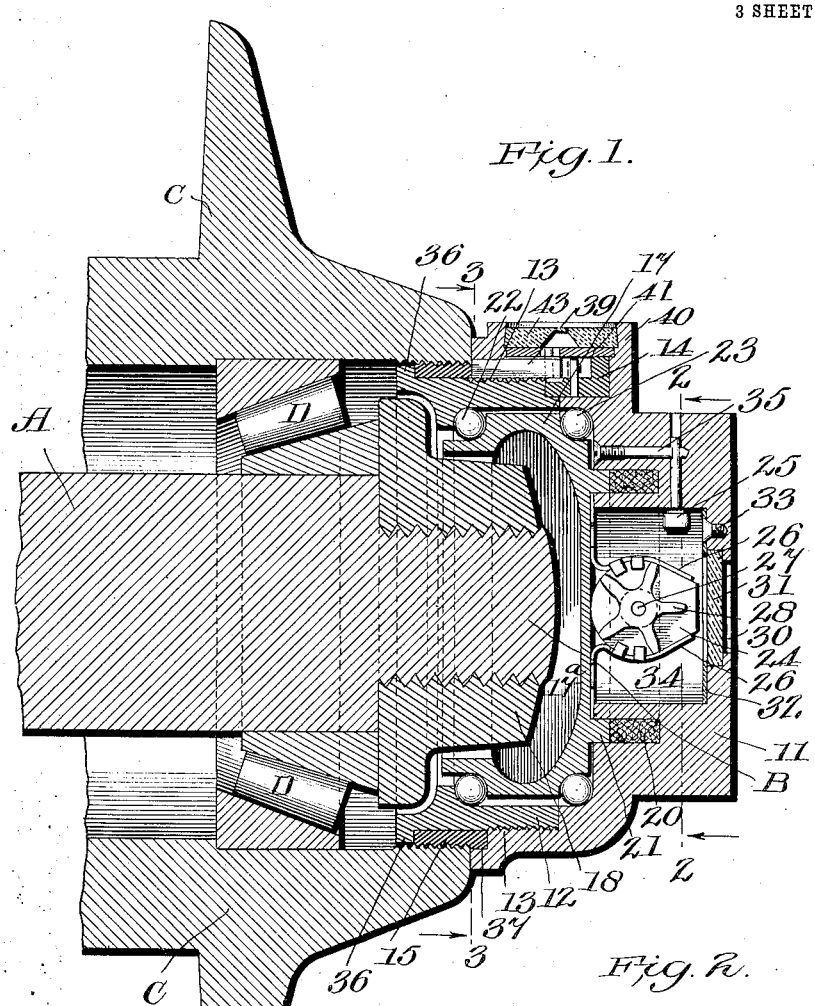

No. 827,614. PATENTED JULY 31, 1906.
H. P. C. BROWNE.
REVOLUTION COUNTER.
APPLICATION FILED MAR. 13, 1905.

3 SHEETS—SHEET 1.

Witnesses
Geo. H. Bignell.
Warren G. Ogden.

Inventor
H. P. C. Browne.
Wilkinson & Fisher
by
his Attorneys

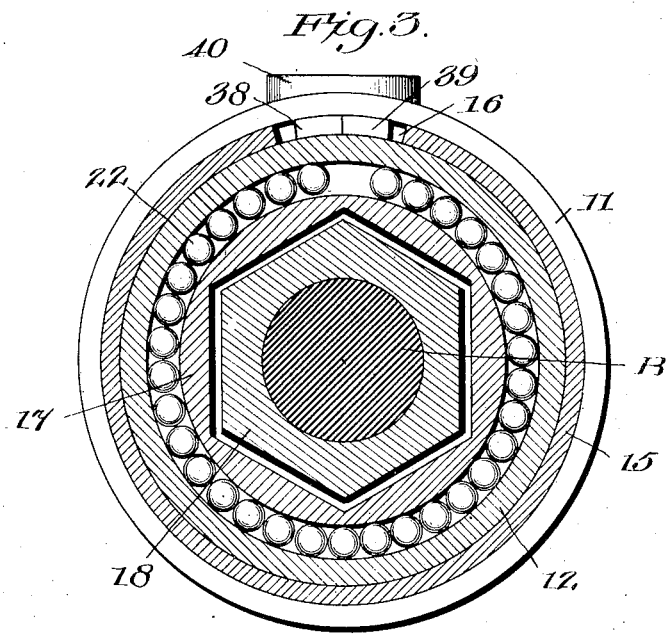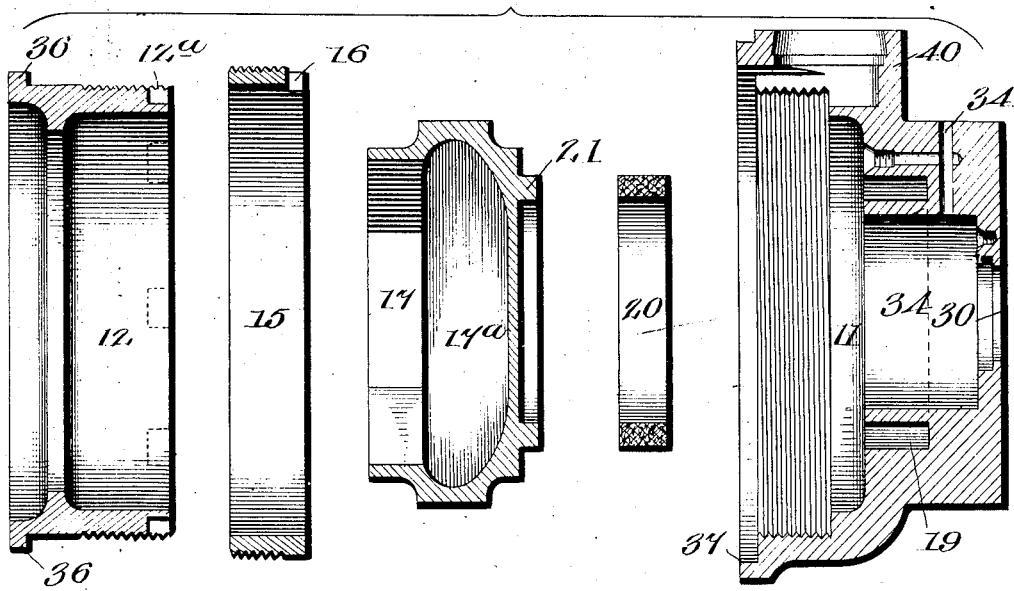

No. 827,614. PATENTED JULY 31, 1906.
H. P. C. BROWNE.
REVOLUTION COUNTER.
APPLICATION FILED MAR. 13, 1905.
3 SHEETS—SHEET 3.
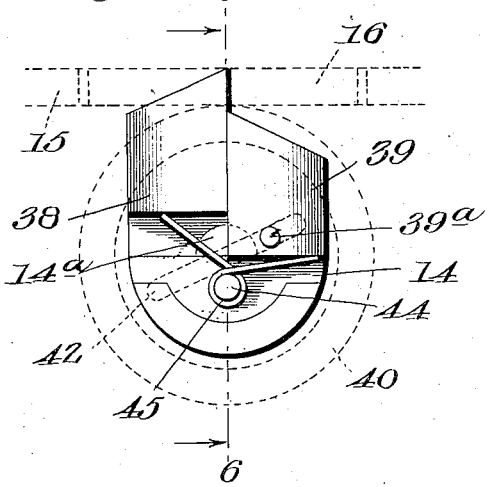
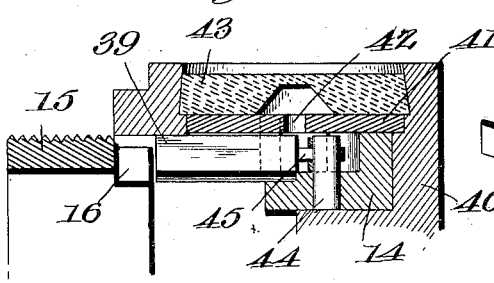
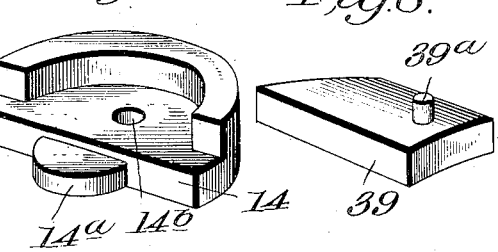
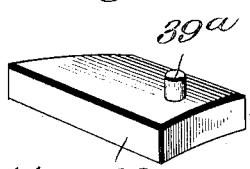
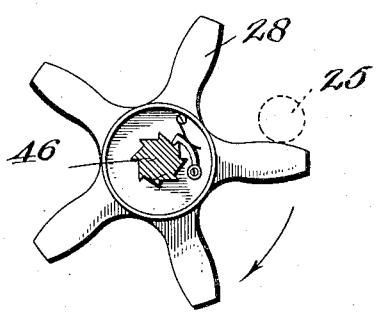
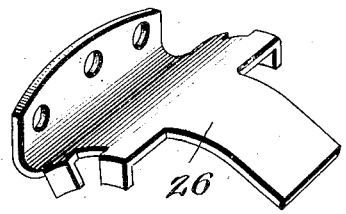
Witnesses
Geo. A. Byrne.
Warren G. Ogden
Inventor
H. P. C. Browne.
By Wilkinson & Fisher
his Attorneys

UNITED STATES PATENT OFFICE.

HARRY P. C. BROWNE, OF NEW YORK, N. Y., ASSIGNOR OF ONE-HALF TO WILLIAM H. PALMER, JR., OF NEW YORK, N. Y.

REVOLUTION-COUNTER.

No. 827,614.

Specification of Letters Patent.

Patented July 31, 1906.

Application filed March 13, 1905. Serial No. 249,912.

*To all whom it may concern:*

Be it known that I, HARRY P. C. BROWNE, a citizen of the United States, residing at New York, in the borough of Brooklyn, in the county of Kings and State of New York, have invented certain new and useful Improvements in Revolution-Counters; and I do hereby declare the following to be a full, clear, and exact description of the invention, such as will enable others skilled in the art to which it appertains to make and use the same.

My invention relates to revolution counters or registers; and the objects of the invention are to improve upon the construction and operation of such devices, locating the same conveniently, but with full protection from injury, combining accuracy with durability, and obviating many of the objections which have heretofore been attendant upon an attempt at a successful use thereof embodying these features.

More particularly, the objects of my invention are to provide a device of the character named so constructed that when it is applied to any object, as a wheel, in relative rotation about a shaft, journal, or other center it will furnish, first, an accurate and continuous additive register of the revolutions of the rotating member independently of change in the direction of its rotation; second, a complete protection of the actuating and registering mechanism from derangement or injury arising from any cause, as contact with extraneous objects, minor road or shop accidents, or loss of adjustment, or through the presence of water, oil, mud, or dust, by mounting said mechanism in a tightly-closed compartment, preferably of metal; third, a complete protection of the actuating and registering mechanism from injury arising through the looseness of fit existing between the rotating member and the bearing, journal, or shaft within or about which it rotates or arising from the axial drift or play of the one upon the other; fourth, a means whereby the removal of the device from its operative position cannot be effected except through the complete rupture and removal of a seal, preferably of soft metal, which seal when thus made may be placed and stamped in position before positioning the device itself; fifth, a means whereby the registering mechanism or cyclometer and the operating mechanism or striker are held in a fixed radial and axial relation to each other which shall not be subject to accidental variation.

To the accomplishment of these objects and such others as may hereinafter appear my invention comprises the novel construction and combinations of parts hereinafter described, and pointed out in the appended claims, reference being had to the accompanying drawings, showing an application of the same to the performance of the functions of an odometer. I do not, however, confine the scope and usefulness of my invention to the limits of an odometer.

Figure 2:
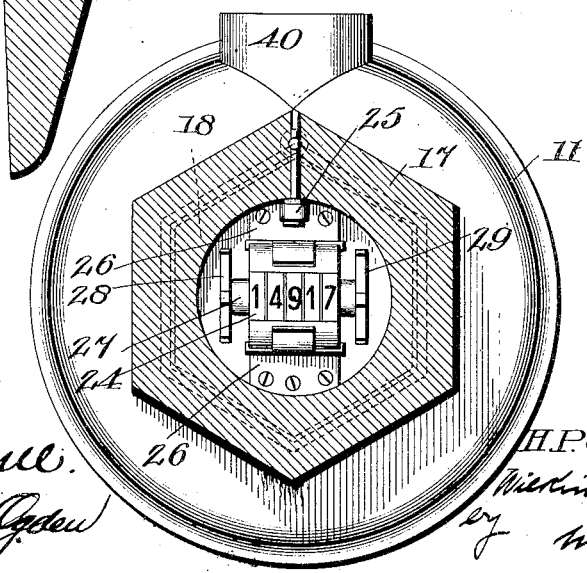

In the drawings, in which the same reference characters designate like parts throughout the several views, Figure 1 is a cross-sectional elevation view showing an odometer embodying my improvements in operative position upon the hub of a vehicle-wheel. Fig. 2 is a transverse elevational view in section on line 2 2 of Fig. 1 looking in the direction of the arrows. Fig. 3 is a transverse elevational view in section on line 3 3 of Fig. 1 looking in the direction of the arrows. Fig. 4 is a view of the main parts of Fig. 1 separated from each other and placed in order for assembling. Fig. 5 is a detail plan view of the manner of mounting the locking device. Fig. 6 is a vertical longitudinal view in section on line 6 6 of Fig. 5 looking in the direction of the arrows. Figs. 7 and 8 are detail views in perspective of parts of the locking device. Fig. 9 is a detail view of one star-wheel of the counting device, and Fig. 10 is a detail view in perspective of the preferred form of clip used for holding the counting-barrel in position.

Referring to the drawings, A represents a vehicle-axle provided with the usual threaded end B, on which axle is mounted a wheel-hub C in any convenient manner, as through the roller-bearings D.

11 shows the exterior portion of one of the two distinct members into which the odometer resolves itself, and 12 shows a supplementary part of this member designed to screw into and become fixed and substantially integral with it by means of the thread 13 and a key 14, provided with a lug 14$^a$, constructed to fit in any one of a series of recesses 12$^a$, formed in the edge of part 12.

15 is a ring fitting snugly over the barrel of part 12, which ring is provided with a thread to correspond with one cut in the inner periphery of the outer end of the vehicle-wheel hub C and further provided with a recess or elongated notch 16 about one-eighth of an inch in depth, cut with squared shoulders from its inner to its outer periphery on its outward edge. Parts 11, 12, and 15 together form a substantially continuous member, which will hereinafter be designated when referred to as such by the term "rotor"—that is, a rotatable member.

17 designates a member provided with a cavity 17ª, having a hexagonal entrant orifice in correspondence with the perimeter of the axle-nut 18, over which it is designed to fit loosely with a perimetral clearance sufficient to permit the axle-nut 18 to play freely in the cavity in an axial direction, but insufficient to permit the edge of the cavity to pass the corners of the axle-nut when the member 17 is impressed with a force tending to communicate a rotary motion to it. This member will hereinafter be designated when referred to in conjunction with the rotor as the "stator" or non-rotating member.

Member 11 is provided with an annular groove 19, adapted to receive a packing-ring 20 of any suitable commercial form, and the stator 17 has provided on its outer face a complementary annular ring 21, adapted to fit in groove 19, against which the packing 20 exerts its expansive force and provides an efficient means for preventing the entrance of oil or other foreign material from the interior of the device into the compartment containing the counting and operating mechanisms.

By means of a bearing, such as that indicated by the ball-races and balls shown at 22 and 23, the stator may revolve freely within the rotor, and vice versa; but both are mutually constrained to a fixed axial and radial relation with each other. This fixedness of the axial and radial relation between the stator and rotor constitutes one distinct feature of my invention, for it is evident that such a fixed and absolute relation provides a means of securing in a strong and serviceable manner a fixed and non-varying relation between the star-wheel of any suitable counting device mounted upon the stator, such as that shown at 24, and the corresponding operating device carried by the rotor, such as that shown at 25, which relation cannot be affected by the jumping of the wheel upon the axle or by the axial drift or play of the wheel along the axle.

The barrel of the counting device 24 is mounted on the outer face of the stator 17 in any suitable manner, as by a pair of clips 26, said barrel having the usual shaft 27, but carrying on each end thereof a star-wheel 28 and 29 for registering forward and backward revolutions of the vehicle-wheel, respectively, as hereinafter described. When parts 11 and 17 are fitted together, the counting device is entirely inclosed by a suitable recess formed in part 11, the front wall of which part is provided with an opening 30, which is covered by a glass 31, held in position by any suitable means, as a ring 32, having set-screws 33 passed therethrough, thus forming a window through which are visible the miles of travel and fractions thereof as integrated by the star-wheels and registering-train of the counting mechanism.

The operating device 25 is constructed of a rod or shank bearing on one end the usual roller and inserted in an aperture or recess 34 formed in the part 11 from the inside and held securely in place by any suitable means, as a screw-pin 35, the amount of projection of the device being so regulated that the roller will make fair contact with arms of star-wheels 28 and 29 as the part 11 revolves with the hub C.

The odometer is placed in and removed from its operative position by means of the ring 15, which is designed to ordinarily slip easily in either direction around the barrel of part 12, upon which it is confined as to its longitudinal movement by shoulder 36 on part 12 and recess 37 in part 11; but by the projection in notch 16 of a pair of beveled-ended latches 38 and 39, seated in a boss 40, formed on part 11, its freedom of rotation around the barrel of part 12 may be limited to rotation in one direction only or altogether prevented, accordingly as one latch or both are allowed freedom to engage with the walls of the notch 16. The latch 38 is designed to permit rotation in the clockwise direction and to prevent it in the counter-clockwise, while latch 39 is designed to permit rotation in the counter-clockwise direction and to prevent it in the clockwise.

The latches 38 and 39 are preferably mounted in the boss 40 by the following construction, which designates one means of performing the function just noted. In the upper face of boss 40 are two recesses, one for the reception of a circular cover-plate 41, which is provided with a diametrically-arranged slot 42, and the other for the reception of a seal 43, preferably formed of some soft metal, the walls of this latter recess being suitably undercut, so as to retain the seal in place. Key 14, which is seated in a recess of boss 40 below cover-plate 41, is provided with a centrally-arranged aperture 14ᵇ, in which is placed a pin 44, about which is wound a suitably-formed spring 45, the two wings of which normally exert a thrust upon latches 38 and 39. Latch 39, however, is provided with a pin 39ª, adapted to project into slot 42, whereby this latch may be kept from projecting into slot 16 of ring 15, according to the position in which cover-plate 41 is held by seal 43.

It is evident from the foregoing that the projection of latch 38 into notch 16 will affect a fixed relation between parts 11 and 15 through which the odometer may be screwed home into the operative position, but which affords no means by which it may be removed thence. Conversely, the projection of latch 39 into notch 16 effects a fixed relation between parts 15 and 11 through which the odometer may be removed from the operative position, but which affords no means by which it may be placed therein. Latch 38 is free to respond at all times to the thrust from spring 45; but with the soft-metal seal 43 in place latch 39 is restrained from movement by the immobility of cover-plate 41 until seal 43 is removed. With the removal of the seal the restraint it imposes upon the cover-plate is relieved, and the force of the spring acting freely upon the latch 39 forces it forward into notch 16, thereby making it possible to remove the odometer.

The operation of the odometer is as follows: The assembled odometer, consisting of rotor, stator, and accessory parts, is screwed home in the outer end of the hub by means of the preferably right-hand thread on ring 15. In this position the axis of the rotor substantially coincides with the axis of the hub, and any angular movement of the hub about its axis is accompanied by an identical angular movement of the rotor about substantially the same axis. The stator meanwhile, fitting over the axle-nut 18, is prevented from following the angular or rotary motion of the rotor by engagement with the corners of the axle-nut 18 and remains stationary with respect to the rotor. At each successive revolution of the vehicle-wheel the operating device or striker 25, mounted within the rotor, is carried into operative engagement with one of the star-wheels of the counting mechanism 24, mounted rigidly on the relatively stationary stator, and propels it through the proper angular travel required to register in the counting mechanism the fraction of a mile through which the vehicle would travel during one revolution of the wheel referred to.

The counting mechanism 24 is similar to the form at present in wide use with the exception of a modification hereinbefore adverted to, whereby every revolution of the vehicle-wheel is registered in the forward or additive direction irrespective of its direction of rotation. This modification constitutes one of the important features of my invention and is indispensable in any revolution-counter which purports to furnish an absolutely-reliable record of all revolutions performed by the wheel, shaft, or other rotating part on which it may be placed.

The star-wheels 28 and 29 are of identical dimensions, and the common shaft 27, on which they are mounted, performs the same functions in the counting mechanism 24 as do similar shafts in the forms of counting mechanisms in general use—viz., that of communicating the angular motion derived by it from the star-wheels 28 and 29 to the interior registering-train, by which train the said motion is duly integrated into convenient distance or other units by some one of the variations of the general form of train commonly employed for that purpose.

It is evident that if the rotary motion communicated to the shaft 27 by the engagement of the operating device or striker 25 with the star-wheel 28 or the star-wheel 29 can be constructed to always take place in the same direction irrespective of the direction of rotation of the vehicle-wheel the registering-train will move in one direction only, and hence show continuously-additive records, whether the revolutions so recorded take place in one direction or in the other, or in both intermittently. This unidirectional rotary motion of the shaft 27 is obtained by the novel means of mounting the star-wheels 28 and 29 loosely upon the shaft 27 and providing each star-wheel with an attachment, such as a pawl-and-ratchet device 46, interconnecting the shaft 27 with its star-wheel. By means of such a device an angular movement of either star-wheel in a given direction will cause an identical angular movement of the shaft, but will be without effect upon it when the movement takes place in the reverse direction. Both star-wheels are designed to communicate the angular motion impressed upon them to the shaft 27 only when the direction of such angular motion is from top, to front, to bottom, to rear, or, in other words, when the direction is clockwise as viewed in Fig. 1. From an inspection of Fig. 2 it is apparent that for each revolution of the vehicle-wheel irrespective of its direction there is an angular movement of one of the star-wheels in the clockwise direction attended by an equal angular movement of the complementary star-wheel in the reverse or inoperative direction. In other words, at each revolution of the vehicle-wheel there is impressed upon the shaft 27 an angular movement which being communicated by the clockwise angular movement of either one of the star-wheels is consequently unidirectional in character. From the foregoing it follows that with the double star-wheel arrangement substantially as described the registering-train of the counting mechanism is driven in one direction only irrespective of the direction of the rotation of the vehicle-wheel.

In the foregoing, as has been stated, the terms "stator" and "rotor" are applied, respectively, to the member 17 and the combination member composed of parts 11, 12, and 15 to specify the function allotted to each in the particular adaptation of my invention to the form and uses of an odometer, as shown in the accompanying drawings. The functions of the two members are interchangeable, however, in an application of my invention to any purpose requiring it—as, for instance, the counting of the revolutions of a shaft in its bearings, the member above termed "stator" could be conveniently made to assume the function of the rotor, and the member above termed "rotor" conveniently made to assume the function of the stator. It is further evident that the counting mechanism 24 may be mounted on either the stationary member or the rotating member and the operating device or striker 25 reciprocally mounted on either the rotating member or the stationary member, provided that the counting mechanism and the operating device be in every case properly positioned with respect to each other and provided that the operative fixed radial and axial relation between the stationary member and the rotating member be maintained as specified. It is further evident that the particular method employed to prevent the stationary member from following the angular or rotary movement of the rotating member in the above-described adaptation of my invention to the form and uses of an odometer—viz., that of providing the stator with a cavity having a hexagonal or other angularly-formed entrant orifice shaped to conform with and coping over the axle-nut 18—may be widely departed from without departing from the spirit of my invention. It is further evident that the method employed to provide the stator or inner member with a bearing in the rotor or outer member, securing thereby mutual freedom of rotation with a fixed axial and radial relation in the above adaptation of my invention to the form and uses of an odometer—viz., that of the balls and ball-races shown at 22 and 23—may be widely departed from without departing from the spirit of my invention.

While I have thus described my invention, I wish it to be distinctly understood that I do not limit myself to the exact details shown and described, as many changes might be made therein without departing from the spirit of my invention, the main idea of which is to produce a revolution-counter composed of a rotating member and a non-rotating member holding the former in permanent adjustment in relation thereto, but permitting it to revolve.

I claim—

1. A revolution-counter, including an outer member adapted to be attached to, and wholly or partially inclose the end of a wheel, bearing-box or other hub; and an inner member; the said inner member to be concentric with the said outer member, and held in a non-varying axial and radial relation thereto, independently of the mechanism to which the revolution-counter may be attached, but permitted to revolve freely in relation thereto, substantially as described.

2. In a revolution-counter, the combination of an outer member adapted to be attached to and wholly or partially inclose the end of a wheel, bearing-box or other hub; an inner member, concentric with said outer member, and held in a non-varying axial and radial relation thereto, independently of the mechanism to which the revolution-counter may be attached, but permitted to revolve freely in relation thereto, a registering-train mounted on one of said members, and an operating or striking device mounted on the other of said members, substantially as described.

3. In a revolution-counter, the combination of an outer member adapted to be attached to, and wholly or partially inclose the end of a wheel, bearing-box or other hub; an inner member, concentric with said outer member, and held in a non-varying axial and radial relation thereto, independently of the mechanism to which the revolution-counter may be attached, but permitted to revolve freely in relation thereto; a registering-train and an operating or striking device therefor, both located within a substantially closed compartment, substantially as described.

4. In a revolution-counter, the combination of an outer member adapted to be attached to and wholly or partially inclose the end of a wheel, bearing-box or other hub; an inner member, concentric with said outer member, and held in a non-varying axial and radial relation thereto, independently of the mechanism to which the revolution-counter may be attached, but permitted to revolve freely in relation thereto; a registering-train and an operating or striking device therefor, both located within a substantially closed compartment, said compartment having a window closed by a transparent medium, substantially as described.

5. In a revolution-counter, the combination of a rotating member and a non-rotating member, said rotating member being held by said non-rotating member but permitted to revolve in relation thereto, a registering-train, and an operating or striking device therefor within a substantially closed compartment, one of said members being provided with an annular groove adapted to receive a packing, and the other of said members being provided with a complementary ring designed to fit within said groove and exert pressure on the packing contained therein, whereby the compartment is closed against the entrance of foreign matter, substantially as described.

6. In a revolution-counter capable of being applied to a rotating and a non-rotating part, the combination of a rotating member and a non-rotating member, said rotating member being held by said non-rotating member, but permitted to revolve in relation thereto, and complementary ball-races constructed upon or mounted on said members, and antifriction-balls in said races, whereby the adjustment of the two members with relation to each other is preserved and yet the rotating member permitted to revolve, substantially as described.

7. In a revolution-counter, the combination of a rotating member and a non-rotating member, said rotating member being held by said non-rotating member, but permitted to revolve in relation thereto, complementary ball-races constructed upon or mounted on said members, the outer of which ball-races is divided at right angles to its axis into two parts, in adjustable relation the one to the other, and a sealed locking device for fixing said two parts in any desired adjustment, substantially as described.

8. In a revolution-counter, the combination with a rotating member and a non-rotating member, said rotating member being held by said non-rotating member, but permitted to revolve in relation thereto, of a threaded ring adapted to secure said revolution-counter in operative position mounted on one of said members, means for securing said ring against lateral movement, and a locking device affording a fixed rotary relation between said ring and said member, effective in either direction at will or in both directions simultaneously, substantially as described.

9. In a revolution-counter, the combination of a registering-train, an actuating-shaft therefor, star-wheels mounted on said shaft, one near each end thereof and a striking device for operating said shaft in either direction, substantially as described.

10. In a revolution-counter, the combination of a registering-train, an actuating-shaft therefor, star-wheels mounted on said shaft one near each end thereof, each of said star-wheels being constructed to impart to said shaft an angular movement equal to its own angular movement when rotating in one direction, but to be without effect upon said shaft when rotating in the reverse direction and a striking device for operating said shaft in either direction, substantially as described.

11. In a revolution-counter, the combination of a registering-train, a shaft therefor, star-wheels mounted on said shaft, one near each end thereof, and an operating or striking device adapted to engage each of said star-wheels and impart to each of them a definite angular movement about the axis of said shaft, substantially as described.

12. In a revolution-counter, the combination of a registering-train, an actuating-shaft therefor, star-wheels mounted on said shaft near each end thereof respectively, and an operating or striking device for said star-wheels adapted to engage therewith, said operating device rotating relatively thereto in a plane parallel to the axis of said shaft, substantially as described.

13. In a revolution-counter, the combination of a registering-train an actuating-shaft therefor, star-wheels mounted on said shaft one near each end thereof, and a rotatable operating or striking device for said star-wheels mounted so as to rotate relatively thereto in a plane parallel to the axis of said shaft and about an axis passing substantially through the center of said shaft, substantially as described.

14. In a revolution-counter, the combination of a registering-train, an actuating-shaft therefor, an operating or striking device mounted to rotate relatively to said shaft in a plane parallel to the axis thereof, and devices adapted when operated by said striking device to communicate to said shaft a unidirectional angular movement about its own axis, irrespective of the direction of rotation of said operating or striking device, substantially as described.

15. In a revolution-counter, a registering-train, a shaft arranged to engage and actuate the same, a star-wheel mounted coaxially upon said shaft substantially at each extremity thereof, an operating or striking device mounted to engage therewith and propel said star-wheel through a definite angular movement, said star-wheel being adapted to communicate identical angular movement to said shaft when rotating in a given direction but to be inoperative thereon when rotating in the reverse direction, said operating or striking device rotating relatively to said star-wheel, in a plane parallel to the axis of said shaft and about an axis passing through substantially the center thereof, substantially as described.

16. In a revolution-counter, capable of being applied to a rotating and a non-rotating part, the combination of a rotating member and a non-rotating member; said rotating member being held by said non-rotating member, but permitted to revolve freely in relation thereto; with a registering-train mounted on one of said members and an operating or striking device mounted on the other of said members; the said registering-train being so constructed that it will be driven in a forward direction only, by the engagement therewith of the said operating or striking device, irrespective of the direction of rotation of the rotating member, substantially as described.

17. In a revolution-counter, the combination of an outer member adapted to be attached to, and wholly or partially inclose the end of a wheel, bearing-box or other hub; an inner member, concentric with said outer member, and held in a non-varying axial and radial relation thereto, independently of the mechanism to which the revolution-counter may be attached, but permitted to revolve freely in relation thereto; a registering-train, and an actuating-shaft for said train, the axis of which shaft lies in a plane at right angles to the axis of rotation of said revolution-counter, substantially as described.

18. In a revolution-counter, the combination of an outer member, adapted to be attached to, and wholly or partially inclose the end of a wheel, bearing-box or other hub; an inner member, concentric with said outer member, and held in a non-varying axial and radial relation thereto, independently of the mechanism to which the revolution-counter may be attached, but permitted to revolve freely in relation thereto, and an operating or striking device rotating in a plane at right angles to the axis of rotation of said revolution-counter, substantially as described.

19. In a revolution-counter, the combination of a rotating member and a non-rotating member, said rotating member being held by said non-rotating member, but permitted to revolve in relation thereto, a registering-train, an actuating-shaft therefor provided near each end with a star-wheel, a striking device, and means adapted to communicate angular movement from said wheels to said shaft about its own axis when rotating in a given direction and to be without effect thereon when rotating in the reverse direction, substantially as described.

20. In a revolution-counter, the combination of an outer member adapted to be attached to, and wholly or partially inclose the end of a wheel, bearing-box or other hub; an inner member, concentric with said outer member, and held in a non-varying axial and radial relation thereto, independently of the mechanism to which the revolution-counter may be attached, but permitted to revolve freely in relation thereto; with locking devices carried by said outer member, for preventing the removal of said outer member from its operative position upon said hub; and a sealing device for said devices, substantially as described.

21. In a revolution-counter capable of being applied to a rotating and a non-rotating part, the combination with a rotating member and a non-rotating member, said rotating member being held by said non-rotating member but permitted to revolve in relation thereto, of a seal composed of material capable of receiving and retaining an impression, said seal being adapted to secure said revolution-counter in place in its operative position, substantially as described.

In testimony whereof I affix my signature in presence of two witnesses.

HARRY P. C. BROWNE.

Witnesses:
WM. H. PALMER, Jr.,
JULIAN HOWARD.